Patented Dec. 16, 1941

2,266,431

UNITED STATES PATENT OFFICE 2,266,431

XANTHENE DYES AND MATERIALS COLORED THEREWITH

James G. McNally and Joseph B. Dickey, Rochester, N. Y., assignors to Eastman Kodak Company, Rochester, N. Y., a corporation of New Jersey No Drawing. Application May 17, 1940, Serial No. 335,869

15 Claims. (Cl. 260—336)

This invention relates to xanthene compounds and to materials colored therewith. More particularly, it relates to xanthene compounds containing in their molecule at least one acid ester of phosphorus group which has the general formula:

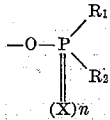

wherein $n$ represents zero or the numeral 1, X represents a member selected from the group consisting of an atom of oxygen, and an atom of sulphur, and $R_1$ and $R_2$ each represents an amino group, an alkylamino group, and the group-OZ, wherein Z represents a member selected from the group consisting of hydrogen, an alkyl group, and alkali forming metal, and wherein the said acid ester group is attached to a nuclear carbon atom or to a carbon atom of a side chain. More specifically, $R_1$ and $R_2$ each represents a methylamino group, an ethylamino group, a butylamino group, a cetylamino group, a hydroxyl group and its alkali metal derivatives, a methoxy group, an ethoxy group, a propoxy group, a butoxy group, a methoxymethoxy group, and the like.

We have found that the above described phosphorus acid esters of xanthene constitute a valuable series of new dyes suitable for coloring textile materials made of cellulose organic derivatives, silk, wool and cotton. The colors obtained on these materials with our dyes are of a reddish shade and show excellent fastness to light and atmospheric conditions. We have found in the actual dyeing process, particularly in the case of dyeing cellulose acetate, that our new dyes impart their colors to the material with relatively greater ease and with better uniformity than do the xanthene dyes known heretofore. In addition, many of our water-soluble dyes are valuable as color absorbing agents in anti-halation backing compositions for photographic films.

It is an object of our invention, therefore, to prepare the above described phosphorus derivatives of xanthene and to color textile materials, as well as to prepare backing dyes, therewith.

The new dye compounds may be prepared by starting with a dye of the xanthene series containing one or more hydroxy groups attached to a carbon atom of the nucleus, or to a carbon atom of a side chain, and phosphating with a suitable reagent such as phosphoric acid, tetraphosphoric acid, phosphoric anhydride, thiophosphoric acid, phosphorus sulfochloride, phosphorus oxychloride, phosphorus trichloride, and various alkoxy and amino derivatives of these compounds. Another method is to condense phthalic anhydride with an aminophenol containing an acid ester of phosphorus group as a substituent in position para to the hydroxyl group such as for example, a 2-dialkylamino-4-hydroxy-benzyl-phosphate, and the like. It will be understood in connection with our new compounds that the group containing the phosphorus ester group is not necessarily limited to being attached to any particular carbon atom of the xanthene nucleus, since it is possible to prepare such substituent in any positon, as desired, by simply employing the appropriate intermediates. Further, our new dyes may contain, if desired, one or more additional substituents on nuclear carbon atoms such as a chlorine atom, a bromine atom, an amino group, an alkyl substituted amino group, an alkyl group such as methyl, ethyl, propyl, and the like, an alkoxy group such as methoxy, ethoxy, butoxy, a nitro group, a sulfonamide group, an alkyl substituted sulfonamide group, and similar kind of radicals.

The following examples further illustrate the methods of preparing our new dye compounds and their applications.

Example 1

1 mole of 3,6-di-ethyl-β-hydroxyethylamino-xanthylium chloride is dissolved in pyridine and treated in the cold with 340 grams of phosphorus oxychloride. The reaction is brought to completion by warming, after which the remaining halogen atoms attached to the phosphorus atom are hydrolyzed with water and the dye salted out. The dye compound thus obtained has the probable formula:

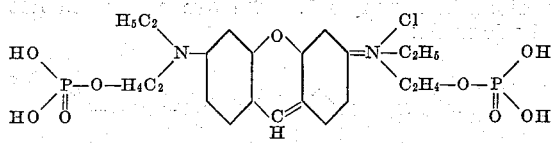

and colors cellulose acetate, silk and mordanted cotton a brilliant crimson red. Any desired salt such as sodium, calcium, barium, ammonium, ethanolamine, and the like, may be prepared by treating the free acid with the calculated amount of the particular base.

Example 2

1 mole of 3,6-dimethylamino-9-propionic-β-hydroxy-ethyl ester-xanthylium chloride is dissolved in dimethylaniline and treated with 1 mole of dimethylamino-phosphorus oxydichloride, and the dye recovered as described in Example 1. The dye compound thus obtained has the probable formula:

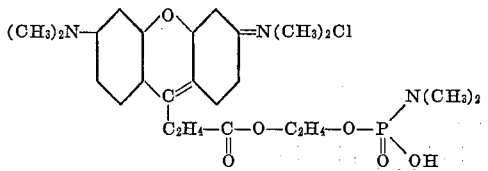

and colors cellulose acetate and cotton a pink shade from an aqueous solution of the dye which may contain salt.

*Example 3*

A mixture of approximately 1 mole of 2-diethylamino-4-hydroxy-benzyl phosphate and approximately 2 moles of phthalic anhydride is heated for a period of about 5 hours at 170–180° C., that is, until the melt becomes crystalline. The product is then digested for several hours with 2% aqueous ammonium hydroxide, extracted with benzene, and the benzene extracted with hydrochloric acid and the product salted out. The dye thus obtained has the formula:

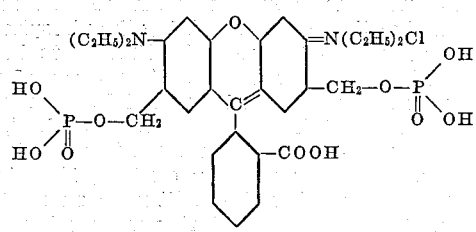

and colors cellulose acetate, wool, cotton and silk bluish-red shades from an aqueous solution which may contain salt. Mordants may be used with advantage. Any desired salt such as sodium, calcium, barium, ammonium, ethanolamine, dimethylamine, and the like, may be prepared by treating the free acid with the calculated amount of the particular base.

*Example 4*

1 mole of fluorescein is treated with an excess of a mixture of ethanolamine and ethanolamine hydrochloride and the melt thus obtained is dissolved in water, neutralized and filtered. The dye intermediate is then reacted with 2 moles of methoxy phosphorus oxydichloride or with 2 moles of dimethoxy phosphorus oxymonochloride, and the dye recovered in the manner described in Example 1. The dye compound has the formula:

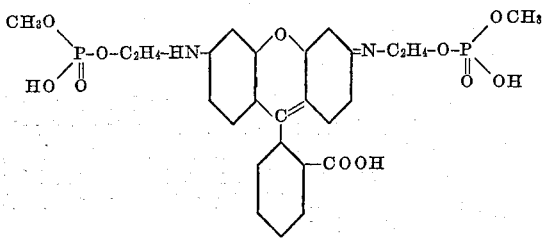

and colors cellulose acetate, silk and wool reddish pink shades from an aqueous solution of the dye which may contain salt.

In place of ethanolamine, there may be substituted compounds such as

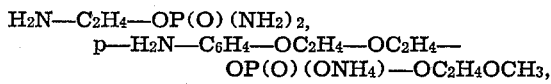

and similar kind of amines.

*Example 5*

1 mole of fluorescein disodium salt is dissolved in cold water and treated with an excess of diethoxy phosphorus oxymonochloride. When the reaction is complete, the mixture is made acid to Congo red indicator with hydrochloric acid, and the dye filtered off, washed and dried. The dye thus obtained has the formula:

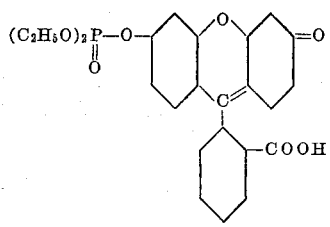

*Example 6*

1 mole of 3-ethyl methylamino-6-decyl-β-hydroxyethylamino-xanthylium chloride is dissolved in pyridine and 1 mole of phosphorus trichloride added at room temperature. The reaction is completed by warming to 60° C., after which an aqueous solution of sodium carbonate is added and the pyridine then removed by evaporation under reduced pressure. The dye obtained has the formula:

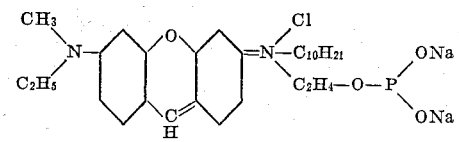

and colors cellulose acetate, wool, silk and mordanted cotton a red shade from an aqueous solution or suspension of the dye.

*Example 7*

1 mole of 3,6-di-dimethyl-amino-9-propionic-β-hydroxyethyl ester-xanthylium chloride is reacted in a solvent medium of pyridine at room temperature with 1 mole of methoxy phosphorus dichloride. The reaction is completed by warming the mixture to 60° C., after which there is added 1 mole of sodium carbonate. The dye compound obtained has the formula:

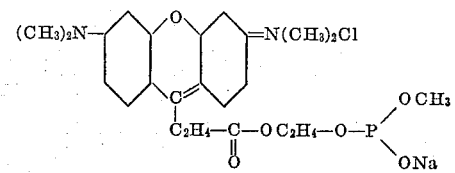

and colors cellulose acetate, wool and silk reddish-pink shades from an aqueous solution or suspension of the dye. Any desired organic or inorganic base salt may be prepared.

*Example 8*

1 mole of 2-(di-methoxyethyl)-amino-4-hydroxy-benzyl dimethylphosphite is heated with phthalic anhydride at 170–178° C. until the melt becomes crystalline. The product is extracted with 2% ammonium hydroxide, then with benzene, and finally with dilute hydrochloric acid. The dye thus obtained has the formula:

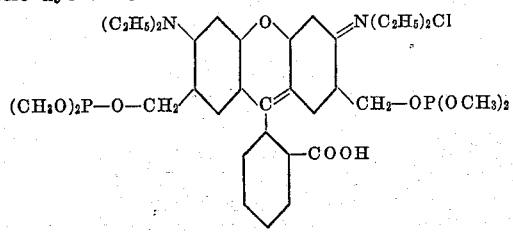

and colors cellulose acetate, wool, silk, wool and cotton bluish-red shades from an aqueous solution which may contain salt. Mordants may be used with advantage.

Example 9

1 mole of 3,6-di-$\beta$-hydroxyethylamino-9-ortho-carboxy-phenyl-xanthylium chlorides is reacted in pyridine with 2 moles of di-methylamino-phosphorus monochloride. The reaction is completed by warming the mixture to 60° C., after which an aqueous solution of sodium carbonate is added, and the pyridine then removed by evaporation under reduced pressure. The dye has the formula:

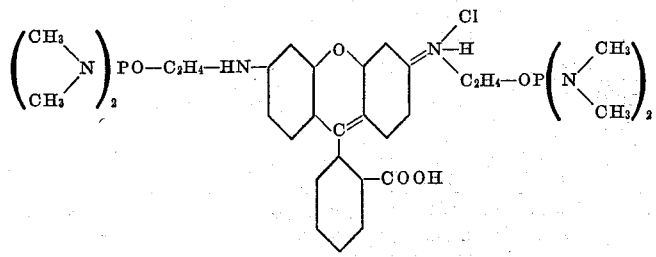

and colors cellulose acetate, wool and silk reddish-pink shades from an aqueous solution or suspension of the dye.

In the application of our phosphorus ester containing xanthene dyes to the coloration of textile materials, particularly cellulose acetate, the dye is ordinarily applied to the material to be colored from an aqueous solution or suspension of the dye. Where the particular dye is readily soluble in water, it can be applied directly to the material from an aqueous solution, advantageously in the presence of salt. For the case where the particular dye is insoluble or only moderately soluble in water, the dye is first ground to a paste with a dispersing agent such as a soap, a sulfonated oil, a higher fatty acid glyceryl sulfate, and the like, and the paste then dispersed in a suitable quantity of water. The material to be colored is immersed in the suspension starting with a bath temperature of about 45-55° C., which is then gradually raised to 80-85° C., at which point the material is worked for several hours. Salt may be added to facilitate exhaustion of the dye bath during the dyeing operation. When the material has acquired the desired shade or condition of color, it is removed from the bath, washed with soap, rinsed and dried.

While our invention is illustrated more particularly in connection with cellulose acetate, silk, wool and cotton, it will be understood that the xanthene compounds above described are by no means limited exclusively to the specific materials named, but are likewise applicable to textile materials in general. For example, other organic derivatives of cellulose may be employed such as hydrolyzed and unhydrolyzed organic acid esters of cellulose or mixed organic acid esters of cellulose including cellulose formate, cellulose propionate, cellulose butyrate, cellulose acetate-propionate, cellulose acetate-butyrate and cellulose ethers including methyl cellulose, ethyl cellulose and benzyl cellulose.

We claim:

1. The xanthene compounds containing in their molecule at least one acid ester of phosphorus group.

2. The xanthene compounds containing in their molecule at least one acid ester of phosphorus group having the general formula:

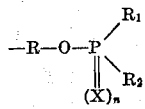

wherein $n$ represents zero or the numeral 1, R represents an alkylene group, $R_1$ and $R_2$ each represents a member selected from the group consisting of an amino group, an alkylamino group, and the group —OZ, wherein Z represents a member selected from the group consisting of hydrogen, an alkyl group, and an alkali forming metal, and X represents a member selected from the group consisting of an atom of oxygen, and an atom of sulphur.

3. The xanthene compounds containing in their molecule at least one acid ester of phosphorus group having the general formula:

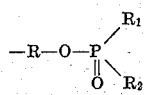

wherein R represents an alkylene group, and $R_1$ and $R_2$ each represents a member selected from the group consisting of an amino group, an alkylamino group, and the group —OZ, wherein Z represents a member selected from the group consisting of hydrogen, an alkyl group, and an alkali forming metal.

4. The xanthene compounds containing in their molecule at least one acid ester of phosphorus group having the general formula:

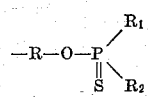

wherein R represents an alkylene group, and $R_1$ and $R_2$ each represents a member selected from the group consisting of an amino group, an alkylamino group, and the group —OZ, wherein Z represents a member selected from the group consisting of hydrogen, an alkyl group, and an alkali forming metal.

5. The xanthene compounds containing in their molecule at least one acid ester of phosphorus group having the general formula:

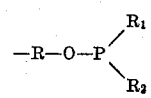

wherein R represents an alkylene group, and $R_1$ and $R_2$ each represents a member selected from the group consisting of an amino group, an alkylamino group, and the group —OZ, wherein Z represents a member selected from the group consisting of hydrogen, an alkyl group, and an alkali forming metal.

6. The 3,6-di-alkylamino xanthene compounds containing in their molecule at least one acid ester of phosphorus group.

7. The 3,6-di-alkylamino xanthene compounds containing in their molecule at least one acid ester of phosphorus group having the general formula:

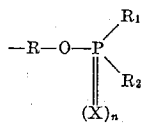

wherein $n$ represents zero or the numeral 1, R represents an alkylene group $R_1$ and $R_2$ each represents a member selected from the group consisting of an amino group, an alkylamino group, and the group —OZ, wherein Z represents a member selected from the group consisting of hydrogen, an alkyl group, and an alkali forming metal, and X represents a member selected from the group consisting of an atom of oxygen, and an atom of sulphur.

8. The 3,6-di-alkylamino xanthene compounds containing in their molecule at least one acid ester of phosphorus group having the general formula:

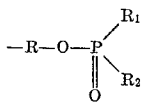

wherein R represents an alkylene group, and $R_1$ and $R_2$ each represents a member selected from the group consisting of an amino group, an alkylamino group, and the group —OZ, wherein Z represents a member selected from the group consisting of hydrogen, an alkyl group, and an alkali forming metal.

9. The 3,6-di-alkylamino xanthene compounds containing in their molecule at least one acid ester of phosphorus group having the general formula:

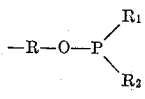

wherein R represents an alkylene group, and $R_1$ and $R_2$ each represents a member selected from the group consisting of an amino group, an alkylamino group, and the group —OZ, wherein Z represents a member selected from the group consisting of hydrogen, an alkyl group, and an alkali forming metal.

10. A textile material selected from the group consisting of an organic derivative of cellulose, silk, wool and cotton colored with a dye selected from the group of xanthene compounds containing in their molecule at least one acid ester of phosphorus group.

11. A textile material selected from the group consisting of an organic derivative of cellulose, silk, wool and cotton colored with a dye selected from the group of xanthene compounds containing in their molecule at least one acid ester of phosphorus group having the general formula:

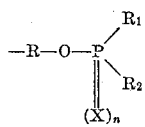

wherein $n$ represents zero or the numeral 1, R represents an alkylene group, $R_1$ and $R_2$ each represents a member selected from the group consisting of an amino group, an alkylamino group, and the group —OZ, wherein Z represents a member selected from the group consisting of hydrogen, an alkyl group, and an alkali forming metal, and X represents a member selected from the group consisting of an atom of oxygen, and an atom of sulphur.

12. A textile material consisting of an organic derivative of cellulose colored with a dye selected from the group of xanthene compounds containing in their molecule at least one acid ester of phosphorus group.

13. A textile material consisting of an organic derivative of cellulose colored with a dye selected from the group of xanthene compounds containing in their molecule at least one acid ester of phosphorus group having the general formula:

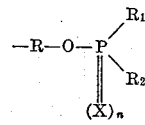

wherein $n$ represents zero or the numeral 1, R represents an alkylene group, $R_1$ and $R_2$ each represents a member selected from the group consisting of an amino group, an alkylamino group, and the group —OZ, wherein Z represents a member selected from the group consisting of hydrogen, an alkyl group, and an alkali forming metal, and X represents a member selected from the group consisting of an atom of oxygen, and an atom of sulphur.

14. A textile material consisting of cellulose acetate colored with a dye selected from the group of xanthene compounds containing in their molecule at least one acid ester of phosphorus group.

15. A textile material consisting of cellulose acetate colored with a dye selected from the group of xanthene compounds containing in their molecule at least one acid ester of phosphorus group having the general formula:

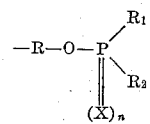

wherein $n$ represents zero or the numeral 1, R represents an alkylene group, $R_1$ and $R_2$ each represents a member selected from the group consisting of an amino group, an alkylamino group, and the group —OZ, wherein Z represents a member selected from the group consisting of hydrogen, an alkyl group, and an alkali forming metal, and X represents a member selected from the group consisting of an atom of oxygen, and an atom of sulphur.

JAMES G. McNALLY.
JOSEPH B. DICKEY.

CERTIFICATE OF CORRECTION.

Patent No. 2,266,431. December 16, 1941.

JAMES G. McNALLY, ET AL.

It is hereby certified that error appears in the printed specification of the above numbered patent requiring correction as follows: Page 3, first column, line 20, for "di-methylamino-" read -- di-dimethylamino- --; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.